United States Patent [19]

Seabolt

[11] Patent Number: 5,229,175
[45] Date of Patent: Jul. 20, 1993

[54] VEHICLE MOLDING ATTACHING ARRANGEMENT

[75] Inventor: Robert M. Seabolt, Sterling Heights, Mich.

[73] Assignee: Chrysler Corporation, Highland Park, Mich.

[21] Appl. No.: 801,138

[22] Filed: Dec. 2, 1991

[51] Int. Cl.$^5$ .................. B60R 13/02; B60R 13/04
[52] U.S. Cl. ........................... 428/31; 428/99; 52/716.7; 24/289; 24/292; 293/128
[58] Field of Search ............ 428/31, 99; 52/717.1, 52/718.1, 573; 293/128; 24/292, 297, 289

[56] References Cited

U.S. PATENT DOCUMENTS 3,354,597  11/1967  Meyer ..................... 52/718.1

Primary Examiner—Alexander S. Thomas
Attorney, Agent, or Firm—Edward P. Barthel

[57] ABSTRACT

An arrangement for attaching a plastic molding strip to a vehicle metal panel exterior surface provided with two parallel rows of weld-on studs fixedly securing a series of T-shaped molding mounting plastic clips to the panel. Each clip, fixedly secured to the panel by an associated upper and lower pair of the studs, has an upper cross-head formed with an upwardly facing notched guide shoulder and a lower foot formed with a snap action fastener. The molding strip is generally C-shaped having interned flanges extending along the upper and lower edges thereof. The upper interned flange is formed with a downwardly directed upper guided rib while an inwardly directed lower guided flange, having a plurality of longitudinally spaced buttons molded thereon, is formed adjacent the lower interned flange. Attachment of the molding strip to the clips is achieved by initially slidably positioning the upper guided rib in the notched guide shoulder of each clip cross-head. The molding strip is thereafter rotated downwardly and an associated lower guided rib button is snapped into interlocked sliding relation with a pair of resilient guide fingers of each clip female fastener. An intermediate reference button is snap-fitted into an associated central clip female fastener aperture so as to be fixedly positioned relative to the central clip. The novel arrangement enables longitudinal fore and aft thermal growth of the molding strip upper and lower guided ribs relative to each clip cross-head notched guide shoulder and each clip female fastener, respectively.

9 Claims, 5 Drawing Sheets

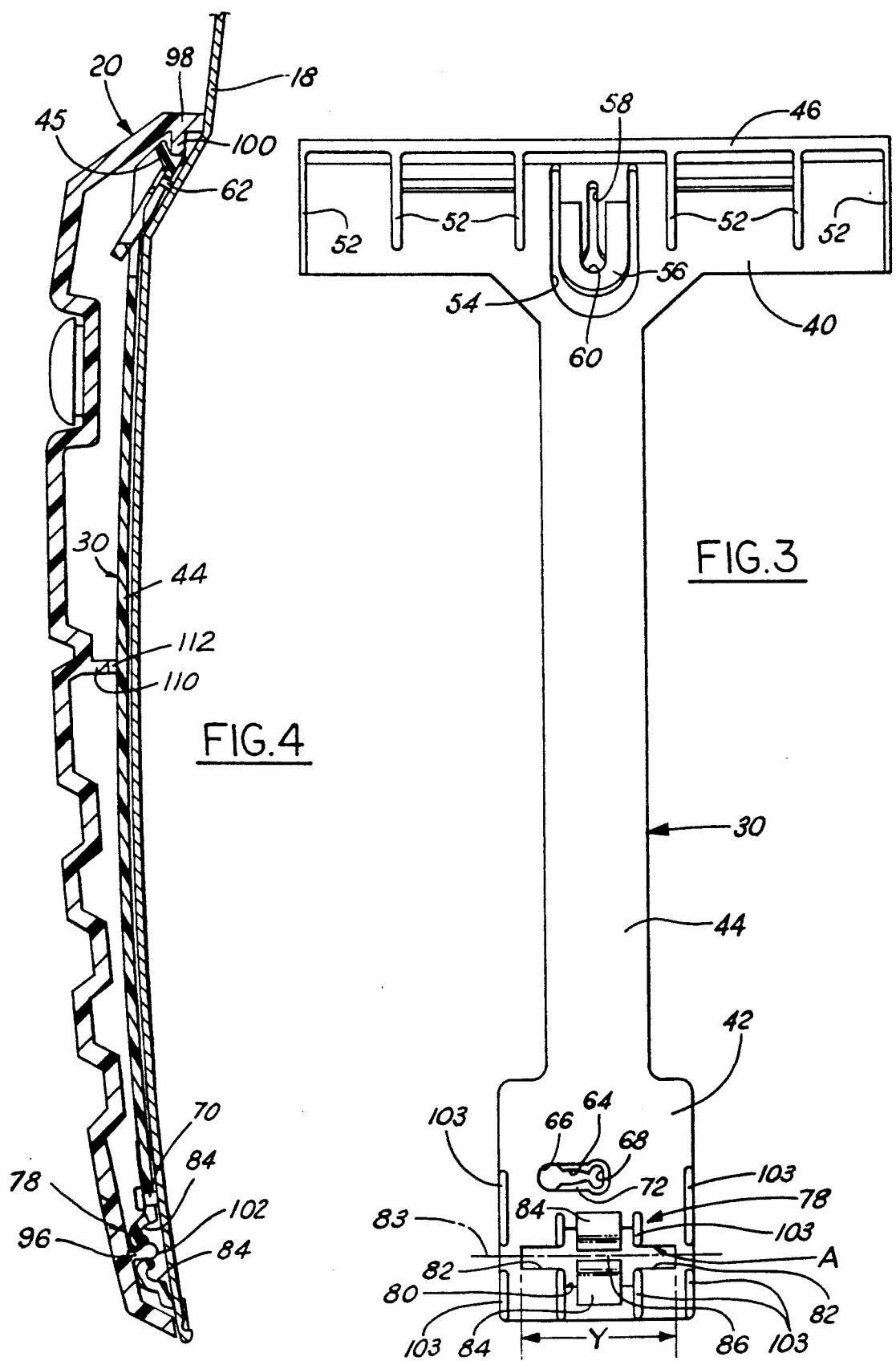

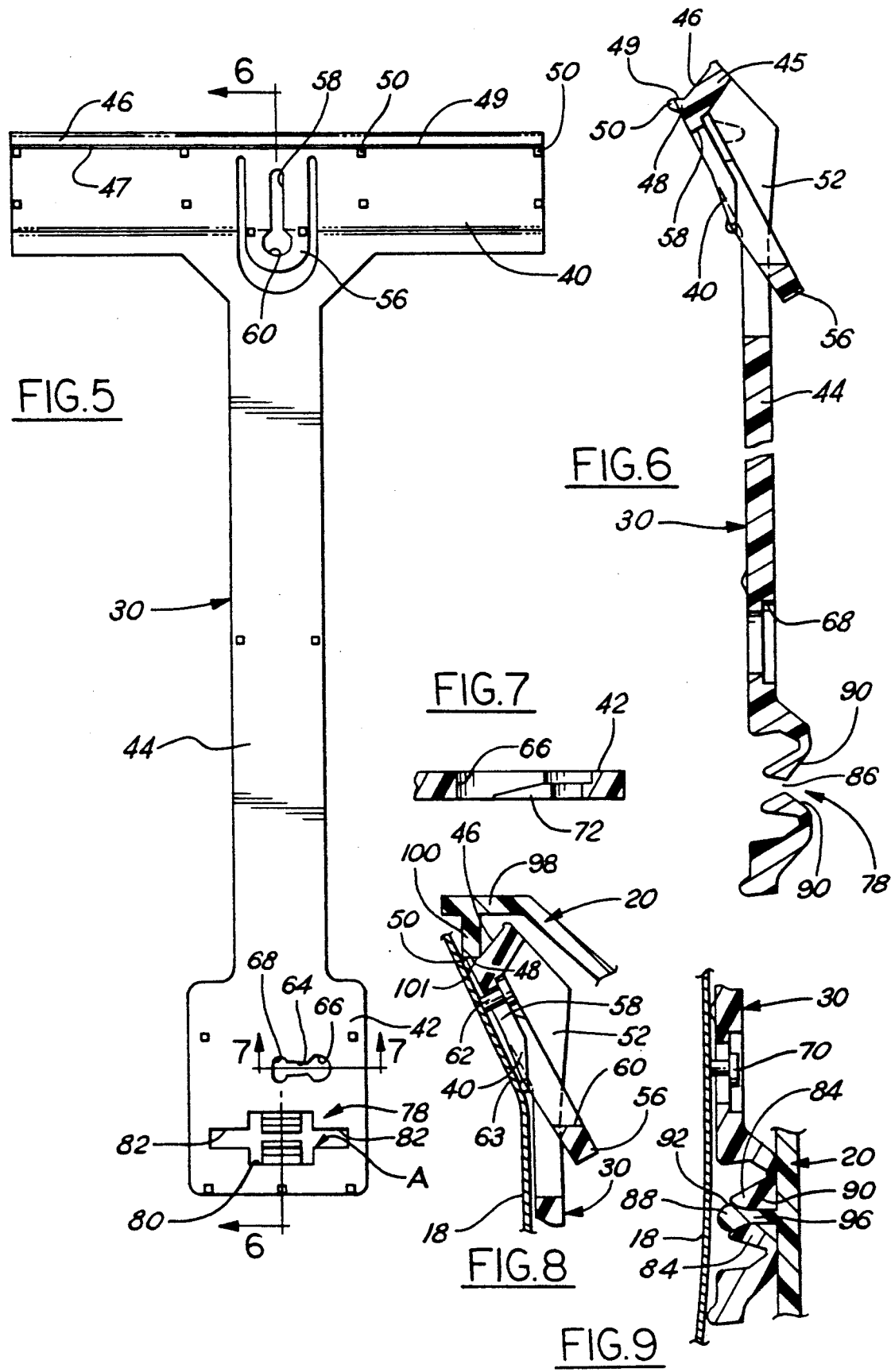

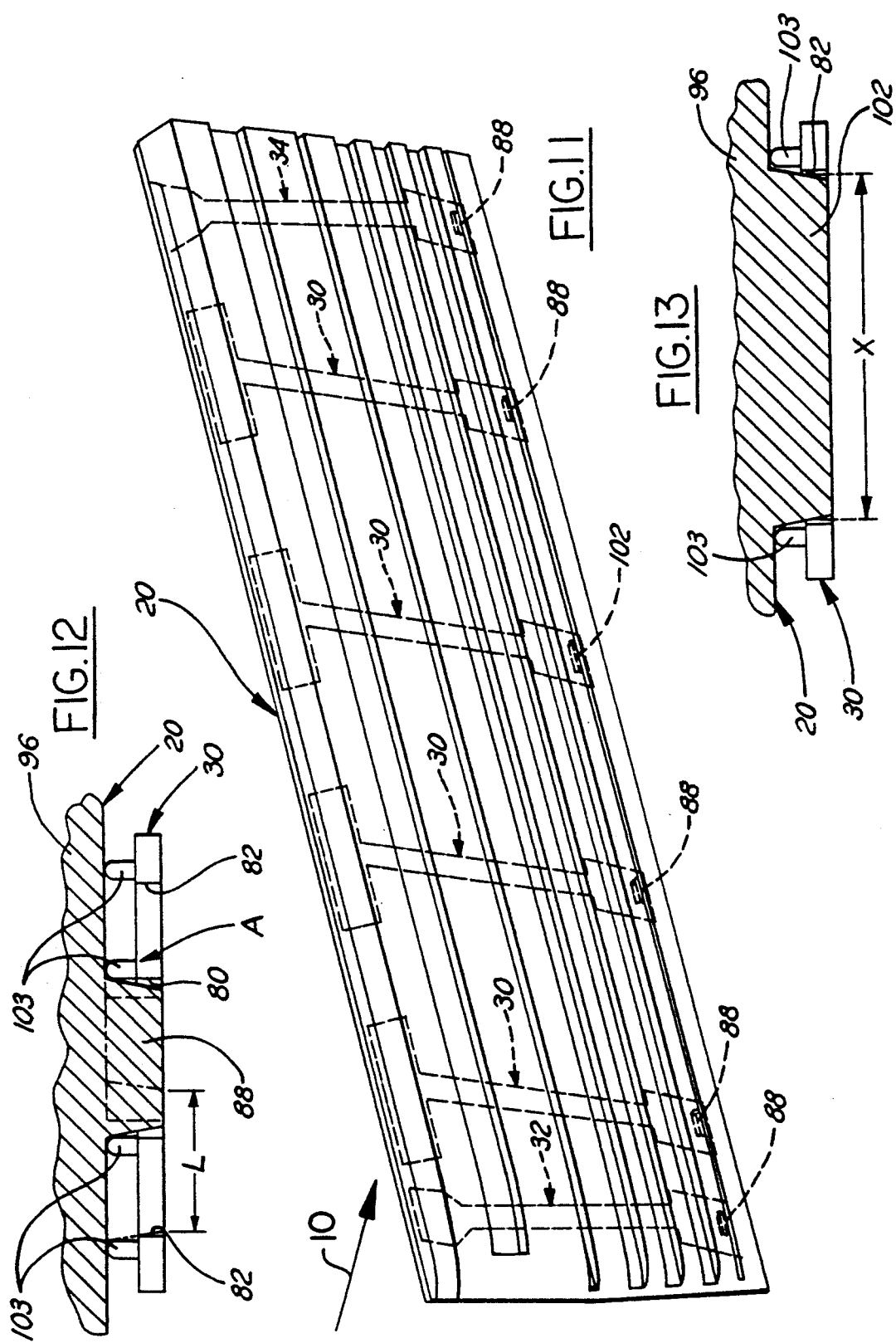

VEHICLE MOLDING ATTACHING ARRANGEMENT

BACKGROUND OF THE INVENTION

This invention relates to fastening arrangements used to secure moldings to a vehicle body structure, and more particularly to an arrangement for readily securing a relatively wide plastic molding strip to an automotive body exterior metal panel while allowing for thermal expansion and contraction.

Various fastening arrangements have been used to secure plastic molding strips to vehicle body panels for decorative purposes which provide means to allow for thermal growth of the molding. An example of one such molding fastening arrangement is shown in the U.S. Pat. No. 4,388,355 issued Jun. 14, 1983 to Ikemizu entitled Moldings For Vehicle Body Structure discloses a resinous molding for a vehicle body structure comprising a generally elongated body made of synthetic resin and having a cavity defined therein. The cavity extends inwardly from one surface of the elongated body and generally over the length of the molding. The cavity also comprises a plurality of generally rectangular thin-walled flexible ribs integrally formed with the body and protruding within the cavity from the bottom of the cavity with the longitudinal axis of each of the ribs oriented generally widthwise of the molding. One side face of the ribs opposite to the bottom of the cavity is adapted to be bonded to an outer surface of the vehicle body structure. Thus, the difference in coefficient of thermal expansion between the molding and the material forming at least the local area of the automobile structure to which it has been fitted can be compensated for by causing the flexible ribs to deform in a direction generally lengthwise of the molding allowing for thermal expansion and contraction.

The U.S. Pat. No. 4,564,232 issued Jan. 14, 1986 to Fujimori et al. entitled Automobile Door discloses an automobile door with an inner plate and an outer plate wherein 1 is attached to a rigid metallic plate, such as steel, through a plurality of fastening holes formed in the longitudinal direction of the synthetic panel. One of the fastening holes near the forward end of the panel has a diameter substantially that of the fastening means. The remaining fastening holes are formed so as to allow longitudinal expansion and contraction to the synthetic panel. A lip portion is formed near the lower edge of the synthetic panel to engage with the inner plate of the door.

The U.S. Pat. No. 4,592,937 issued Jun. 3, 1986 to Nagata et al. entitled Arcuate Side Molding discloses an arcuate resin plate side molding of a vehicle adapted to be attached to a curved surface of an automobile metal body avoiding holes being formed therein. The thermal expansion coefficient of the plastic side molding is different from that of the automobile metal body panel. Therefore, the direct attachment of the molding to the metal body results in thermal deformation of the molding relative to the body, for example, in during a hot day in summer. In the Nagata, et al. patent the molding comprises a resin plate having projections formed in the backside thereof, and an intermediate member provided with slots for receiving the projections of the resin plate. In assembling the resin plate and the intermediate member, the projections are inserted through the slots of the intermediate member, and then the tips of the projections are heat caulked to join the intermediate member to the resin plate. In this way the resin plate and the intermediate member are longitudinally slidable relative to each other.

The U.S. Pat. No. 4,800,699 issued Jan. 31, 1989 to Lang discloses a Molding/Locating and Attaching Clip Device which is adapted to be secured by a headed stud to a support panel and to which an open channel molding can be secured and, a molding locator clip which is adapted to be secured into a notched flange of the molding. Pawl arms on the molding retainer clip are adapted to engage ratchet teeth on the molding locator clip so that the molding and molding clip can be moved relative to the molding retainer clip in one direction and to prevent movement in the opposite direction.

SUMMARY OF THE INVENTION

Accordingly, it is an object of the present invention to provide a convenient arrangement for the precise mounting of a synthetic resin molding strip on a series of plastic clips fixed to a vehicle exterior metal panel by means of upper and lower parallel guided ribs integral with the interior of the molding strip. The upper guided rib is slidably received on guide shoulder means of each clip while the lower guided rib has spaced buttons formed thereon whereby each button is slidably captured between guide spring finger means on each clip enabling longitudinal fore and aft thermal growth of the molding strip relative to the metal panel.

It is another object of the present invention to provide an attaching arrangement as set forth above whereby an intermediate reference button on the lower guided rib is received in locked engagement with an associated intermediate reference clip spring finger means such that the molding strip undergoes fore and aft thermal growth from the reference clip.

It is still another object of the present invention to provide an attaching arrangement as set forth above whereby the upper guided rib is initially received in a notched guide shoulder formed along an upper crosshead portion of each T-shaped clip and thereafter is only necessary to rotate the molding strip downwardly and snap each of the lower guided rib buttons between a pair of vertically opposed spring fingers of an associated female fastener integrally formed in a lower foot portion of each clip.

The resulting construction, wherein the T-shaped clips are formed with upper and lower keyslots, enables the clips to be readily secured to two parallel rows of weld-on studs located on the exterior surface of a vehicle metal panel thereby eliminating a large number or variety of molding fasteners.

DESCRIPTION OF THE DRAWINGS

Further objects, features, and advantages of the invention will become apparent to those skilled in the art upon reference to the following description and accompanying drawings in which:

FIG. 3 is a front detail view of an attachment clip of the present invention as viewed from outboard of the vehicle;

FIG. 4 is a vertical sectional view taken substantially on the line 4—4 of FIG. 10;

FIG. 5 is front view of an attachment clip as viewed from inboard of the vehicle;

FIG. 6 is a vertical sectional view taken on the line 6—6 of FIG. 5;

FIG. 7 is a fragmentary enlarged horizontal sectional view taken on the line 7—7 of FIG. 5;

FIG. 8 is a fragmentary enlarged vertical sectional view taken substantially on the line 8—8 of FIG. 10;

FIG. 9 is a fragmentary enlarged vertical sectional view taken substantially on the line 9—9 of FIG. 10;

FIG. 11 is a detail perspective view of the molding strip 20 of FIG. 1 with its set of mounting clips shown in dashed lines;

FIG. 12 is a enlarged fragmentary horizontal sectional view taken on the line 12—12 of FIG. 10; and FIG. 13 is an enlarged fragmentary horizontal sectional view taken on the line 13—13 of FIG. 10.

DETAILED DESCRIPTION OF THE INVENTION

Figure 1:
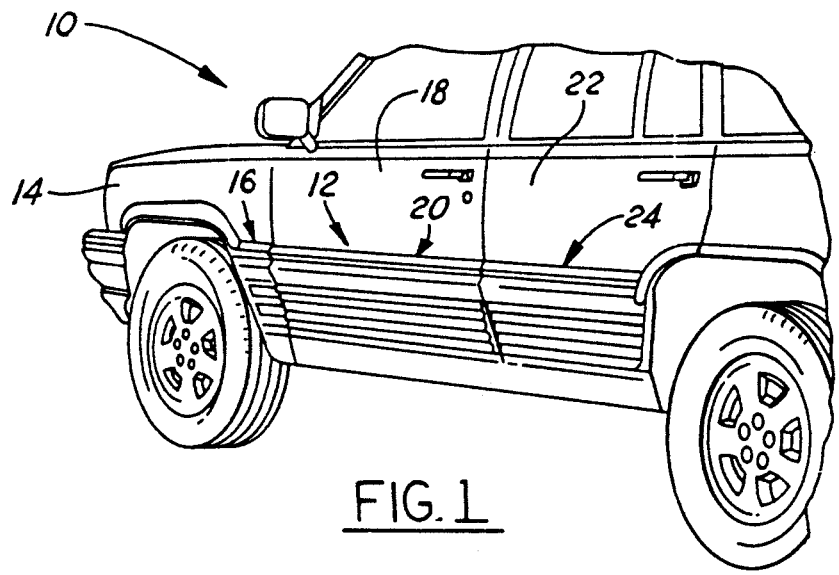
FIG. 1 is a fragmentary perspective view of a vehicle viewed from the left rear quarter to which this invention is applicable.

Referring now to the drawings FIG. 1 illustrates a automotive vehicle 10 which is provided with a series of ornamental and protective body side relatively wide molding or cladding trim strips, generally indicated at 12, formed from suitable synthetic resinous or plastic material. The vehicle 10 is shown with a fender panel 14 supporting a molding strip 16, a front door panel 18 supporting a molding strip 20, and a rear door panel 22 supporting a molding strip 24. It is desired that the molding strips 16, 20, and 24 be exactly aligned along the length of the vehicle so as to provide a continuous sight line to the observer. It is also necessary to accommodate for the differences in thermal growth or expansion between the plastic molding strips 16, 20, and 24 and their associated metal panels 14, 18, and 22 respectively.

Figure 2:
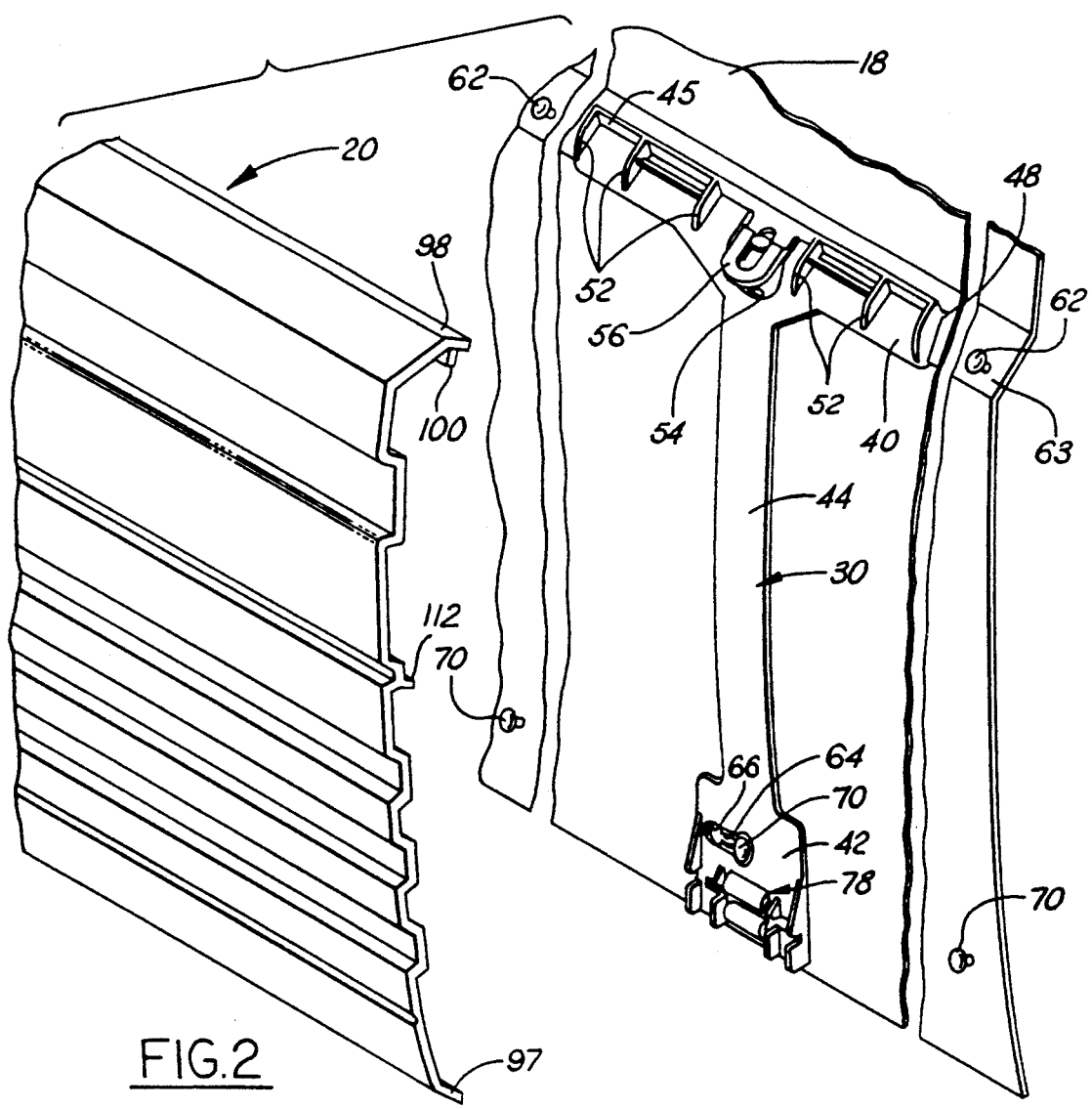
FIG. 2 is a fragmentary exploded perspective view of the vehicle lower side panel showing an arrangement for mounting a plastic molding thereto in accordance with the present invention.

Turning now to FIG. 2 there is shown a portion of the generally open channel or C-shaped plastic molding strip 20 adapted to be secured to the exterior surface of its associated front door panel 18 by means of a series or plurality of plastic FIG. 11 the plastic trim strip 20 is secured by a series of substantially uniformly spaced identical clips 30 flanked by a forward clip 32 and an aft clip 34 with the clips 32 and 34 having oblique portions and reduced dimensions to match or accommodate for angled panels, door openings and the like.

As best seen in FIGS. 2, 3 and 6 each T-shaped clip 30 comprises an upper cross-head portion 40 and a lower foot portion 42 interconnected by an elongated substantially vertically extending narrow strap portion 44. The cross-head 40 is formed with a generally rectangular-sectioned longitudinally extending upper beam portion 45 having an inboard facing sloped face 46 inclined upwardly and outwardly from a laterally inboard projecting lipped edge 48 defining an upwardly facing notched guide shoulder 49. A series of longitudinally spaced inboard extending tabs 50 are provided, if required, to laterally extend the shoulder 49.

FIGS. 2 and 3 show the cross-head upper beam 40 integrally molded with a plurality of uniformly spaced reinforcing gussets 52 on either side of a central arched cutout 54 with the cutout provided with a flexible elastic upper engagement tongue 56. As seen in FIG. 6 the tongue 56 is molded in a "struck" manner from the cross-head cut-out 54 so as to normally project obliquely outwardly and downwardly toward the molding from a laterally extending flexible hinged juncture 58. The hinged juncture 58, providing the upper terminus of the cutout, is formed integral with a lower central sector of beam 45 bridging the cutout 54.

With reference to FIGS. 3 and 5 each engagement tongue 56 is formed with a vertically downwardly extending elongated upper keyslot 58. Each keyslot terminates at its lower end in an entry hole 60 sized for receiving an associated upper headed fastening stud 62 enabling each cross-head keyslot to be slipped downwardly on its stud positioning each cross-head on a longitudinally extending beveled character surface 63 formed in the metal panel 18. As seen in FIG. 2 upper stud 62 is one of a longitudinal series of two parallel upper and lower rows of fastening studs 62 with the upper row secured to the contour or character surface portion 63 formed in the panels 14, 18 and 22. It will be appreciated that each engagement tongue 56 is readily flexed inwardly by the installer during clip installation for ease of reception of its associated headed stud 62 on the character surface portion 63.

It will be seen in FIG. 3 that each clip foot portion 42 has a laterally extending lower keyslot 64 terminating at one end in an entry hole 66 while its opposite end terminates in a locking hole 68 has its major vertically disposed axis aligned on vertical its associated clip 30 vertical axis of symmetry shown at 69 in FIG. 3. Thus, upon each cross head 40 being secured to its associated upper stud 62 its entry hole 66 is exactly positioned to be slipped over the head of its associated lower fastening stud 70 (FIG. 4). Each lower row stud 70 is shown aligned vertically below its associated upper row stud 62. FIGS. 3 and 7 show the lower keyslot 64 formed with a countersunk ramp portion 72 providing wedging engagement of its associated lower headed stud 70 upon the clip foot 42 being slid sideways, leftward as viewed in FIG. 2, to its installed position.

As shown in FIG. 3 each clip foot portion 42 is provided with an integral female fastener 78 in the form of a laterally extending aperture, generally indicated at "A". The aperture "A" is defined by a central rectangular opening 80 communicating with a pair of mirror image closed slots extending longitudinally 82 on either side thereof. FIG. 3 depicts a female fastener aperture "A" symmetrically disposed about longitudinal axis of symmetry 83. The central opening 80 of each clip has two opposed upper and lower vertically spaced apart spring fingers 84 which are formed out of the plane of the clip foot 42 to define a longitudinally extending slit 86 therebetween. The spring fingers 84 are so shaped as to be spread apart when the clip fastener 78 is pressed over an associated cylindrical-sectioned elongated male fastener or button 88 (FIGS. 9, 10 and 12) and into engagement therewith.

It will be noted in FIG. 6 that the spring finger slit 86, defined in part by a pair of inwardly converging tapered lead-in opposed inboard faces 90 and by a pair of outwardly diverging tapered opposed outboard faces 92, provides opposed line-contact parallel edges 94. Each slit 86 is of a predetermined width or transverse dimension whereby upon its fingers being contacted by an associated button 88 the pair of fingers 84 will be resiliently spread apart to allow the ready interlocked capture by the female fastener 78.

As seen in FIG. 9 a plurality or series of buttons 88 are substantially equally spaced laterally inboard projecting lower guide rib 96 with the rib 96 molded on the molding strip inner surface adjacent a lower edge interned flange 97 of the molding strip 20. It will be noted in FIG. 12 that each button 88 extends longitudinally a dimension substantially equal to but slightly less than the longitudinal extent of its associated central opening 80 slightly greater than its associated pair of spring fingers 84. Further, in the spring fingers' relaxed or normal position the slit 86 formed therebetween by the opposed line-contact edges 94 has a predetermined dimension substantially equal but slightly less than the thickness of the lower guided rib 96. As a result, with the spring fingers 84 bottomed on the molding strip inner surface the opposed the line-contact edges 94 capture the button 88 while in tensioned sliding support contact with the lower guide rib 96 opposite side faces.

With reference to FIG. 4 it will be seen that the molding strip 20 is formed with a substantially horizontal interned upper terminal flange portion 98 having a downwardly directed longitudinally extending upper guided rib 100. FIG. 8 shows the upwardly facing notched guide shoulder 48 slidably After the clips 30 and 32 are mounted on the body side panel 18 the moldlng strip 20 is assembled to the clips by first moving the upper guided rib 100 into the notched shoulder 48 after which each button 88 is snapped into its associated female fastener 78. Applicant's upper guided rib 100 flexible flange portion 98 mounting arrangement provides for resilient "pull down" of the molding strip 20 for snap-in attachment of its series of buttons 88 thereby preventing rattle, as well as improving the moldings appearance. It will be noted in FIGS. 12 and 13 that the outboard surface of each lower foot portion 42 is provided with outboard projecting upper and lower sets of fins 103 on either side of its associated female fastener 78 to provide controlled lateral spacing with the molding inner surface.

Figure 10:
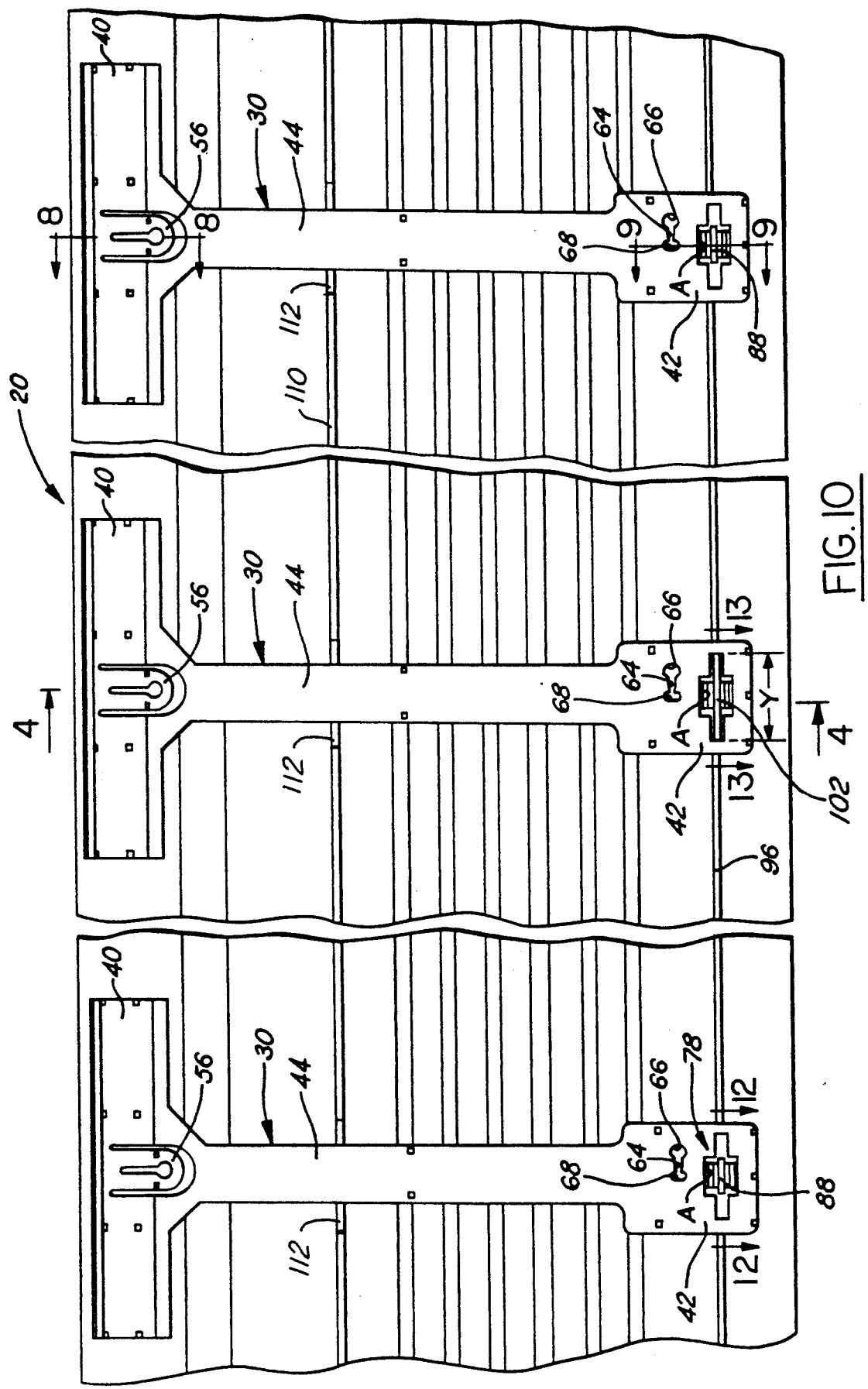
FIG. 10 is a fragmentary front detail view of the molding and its set of attachment clips taken in the direction of arrow "FIG. 10" in FIG. 11.

With reference to FIGS. 10 and 13 the lower guided rib 96 is formed with a central reference button 102 identical to the buttons 88 except that it has a predetermined length "X" substantially equal to but slightly less than the overall length "Y" of its associated aperture "A". It will be appreciated that FIG. 10 depicts the condition of a molding strip 20 installed on a vehicle panel during an assembly line operation with a controlled ambient temperature of about 70 degrees F. Initially each of the plurality of buttons 88 are snapped into their associated female fasteners 78 with a resultant longitudinal centering relative to its aperture "A" central opening 80 as seen in FIG. 12.

The plastic molding strip intermediate reference button 102 is fixedly anchored to a central reference clip female fastener 78 and thus to the vehicle panel 18 enabling longitudinal fore and aft thermal growth of the plastic molding strip, via its upper and lower guided ribs, relative to its fixed mounting clips 30, 32 and 34. The invention allows the relatively wide molding strip 20 freedom to thermally expand and contract in both forward and aft longitudinal directions from the reference button 102 in a controlled guided manner thereby obviating distortion of the molding strip. In the disclosed embodiment the front door molding strip 20 has an overall height of about ten and one-half inches (10.5 in.) and an overall length of about twenty eight inches (28 in.).

It will be seen in FIGS. 4 and 10 that a central longitudinal backing rib 110 is formed on the inside surface of the molding strip 20. The central backing rib 110 is formed with a series of cut-outs 112 allowing reception therethrough of an associated clip strap portion 44. Each cut-out 112 extends longitudinally a predetermined length providing clearance of the strap portions 44 during longitudinally fore and aft thermal growth of the molding strip 20.

Obviously, many variations and modifications of the present invention are possible in light of the above teachings. It is, therefore, to be understood that within the scope of the appended claims, the invention may be practiced otherwise than as specifically described.

What is claimed is:

1. An attaching arrangement for installation of a plastic molding strip on a metal panel of a vehicle body comprising in combination:

an elongated plastic open channel molding strip having inboard and outboard surfaces terminating in an upper and lower longitudinally extending terminal flanges projecting inboard said upper terminal flange formed with a vertically depending upper guided rib substantially coextensive therewith, said molding strip inboard surface formed with a horizontally disposed longitudinally extending lower guided rib adjacent said lower terminal flange, each said upper and lower guided rib having a predetermined thickness;

a series of substantially identical plastic generally T-shaped clips including an intermediate reference clip longitudinally spaced along an outboard surface of the metal panel, each said clip having an upper cross-head and a lower foot interconnected by a elongated substantially vertically extending strap;

upper mounting means fixedly connecting each said clip cross-head to said panel and lower mounting means fixedly connecting each said clip foot to said panel, each said crosshead having an upwardly facing longitudinally extending notched guide shoulder slidably receiving said molding upper guided rib therein enabling fore and aft thermal growth movement of said upper guided rib relative to each said clip;

each said clip foot portion formed with a female fastener comprising a horizontally extending aperture having a longitudinal axis of symmetry, each said aperture having an enlarged rectangular shaped central opening formed with a pair of upper and lower opposed mirror image locking spring fingers, each said spring finger extending outwardly so as to terminate in a reversely bent radius having a free end thereof projecting into its central opening, such that each said pair of spring finger free ends define a longitudinally extending slit therebetween;

said molding lower guided rib having a plurality of elongated horizontally disposed buttons projecting inboard therefrom positioned in a predetermined spaced manner, each said button of a predetermined cross section passing through its associated female fastener slotted space in a snap action manner such that each said pair of spring fingers support said lower guided rib therebetween enabling fore and aft temperature induced sliding movement of said lower guided rib relative to each said clip foot;

all but one of said buttons having a first predetermined length substantially equal to the length of its associated clip female fastener central opening, and said one reference button having a second predetermined extended length substantially equal to but slightly less than the length of its associated reference clip female fastener aperture, whereby said molding strip one extended length reference button being fixedly positioned relative to said metal panel by its associated intermediate clip female fastener aperture; and whereby said attaching arrangement enabling longitudinal fore and aft thermal growth of said plastic molding strip upper and lower guided ribs relative to each said clip cross-head notched guide shoulder and each said clip female fastener pair of guide spring fingers, respectively.

2. The plastic molding strip attaching arrangement as set forth in claim 1 wherein each said clip foot aperture defined by a central rectangular opening communicating with a pair of mirror image closed slots extending longitudinally on either side thereof.

3. The plastic molding strip attaching arrangement as set forth in claim 2 wherein each said locking spring finger extending outwardly so as to terminate in a reversely bent radius having a free end thereof projecting into its associated finger free ends define a longitudinally extending slit therebetween.

4. The plastic molding strip attaching arrangement as set forth in claim 3 wherein each said locking spring finger extending longitudinally a dimension substantially equal to but slightly less than the longitudinal dimension of its associated central rectangular aperture.

5. The plastic molding strip attaching arrangement as set forth in claim 3 wherein each said button extends longitudinally a dimension substantially equal to but slightly less than the longitudinal dimension of its associated central rectangular opening.

6. The plastic molding strip attaching arrangement as set forth in claim 5 wherein each said spring finger slit is of a predetermined width defined by a pair of inwardly converging lead-in opposed spring finger inboard faces and a pair of outwardly diverging tapered opposed spring finger outboard faces providing opposed line-contact parallel edges defining an associated slit therebetween, whereby upon each pair of spring fingers being resiliently spread apart allowing the ready passage of an associated button therebetween such that upon each pair of spring fingers returning to their normal relaxed position the longitudinal line-contact slit formed thereby having a predetermined width substantially equal to but slightly less than said lower guided rib thickness.

7. The plastic molding strip attaching arrangement as set forth in claim 1 wherein each said clip cross-head formed with a generally rectangular sectioned longitudinally extending upper beam portion coextensive therewith said beam having an inboard facing sloped face inclined upwardly and outwardly from a laterally inboard projecting guide shoulder.

8. The plastic molding strip attaching arrangement as set forth in claim 1 wherein said upper mounting means comprising a central flexible engagement tongue formed from a obliquely outboard and downward from an integral hinged horizontal juncture defining the upper terminus of said cut-out, each said engagement tongue formed with a vertically downwardly extending upper keyslot terminating at its lower end in an entry hole sized for receiving an associated upper headed stud, each said upper keyslot major axis coinciding with a vertical axis of symmetry of each said clip, whereby upon each upper keyslot being slipped downwardly on its stud so as to position each said cross-head on a beveled character surface formed in said vehicle 9. The plastic molding strip attaching arrangement as set forth in claim 8 wherein each said lower mounting means comprising a lower horizontally oriented longitudinally extending keyslot terminating at its one end in an entry hole while its opposite end terminates in a vertically elongated oval-shaped stud locking hole, said locking hole having its upon each said clip being slid sideways its associated lower stud head engaging a ramp portion providing wedged engagement thereof in said locking hole.

* * * * *